United States Patent
Spulber et al.

(10) Patent No.: US 12,059,654 B2
(45) Date of Patent: Aug. 13, 2024

(54) SELF-ASSEMBLED NANOSTRUCTURES AND SEPARATION MEMBRANES COMPRISING AQUAPORIN WATER CHANNELS AND METHODS OF MAKING AND USING THEM

(71) Applicant: Aquaporin A/S, Kongens Lyngby (DK)

(72) Inventors: Mariana Spulber, Charlottenlund (DK); Krzysztof Trzaskus, Kongens Lyngby (DK)

(73) Assignee: Aquaporin A/S, Kongens Lyngby (DK)

( * ) Notice: Subject to any disclaimer, the term of this patent is extended or adjusted under 35 U.S.C. 154(b) by 337 days.

(21) Appl. No.: 16/076,402

(22) PCT Filed: Feb. 6, 2017

(86) PCT No.: PCT/EP2017/052567
§ 371 (c)(1),
(2) Date: Aug. 8, 2018

(87) PCT Pub. No.: WO2017/137361
PCT Pub. Date: Aug. 17, 2017

(65) Prior Publication Data
US 2019/0076789 A1    Mar. 14, 2019

(30) Foreign Application Priority Data

Feb. 8, 2016   (DK) .............................. PA201600079
Apr. 27, 2016  (DK) .............................. PA201600249

(51) Int. Cl.
*B01D 69/08* (2006.01)
*B01D 61/00* (2006.01)
(Continued)

(52) U.S. Cl.
CPC ........... *B01D 69/08* (2013.01); *B01D 61/002* (2013.01); *B01D 69/1251* (2022.08);
(Continued)

(58) Field of Classification Search
CPC .. B01D 69/08; B01D 61/002; B01D 69/1251; B01D 69/144; B01D 61/025;
(Continued)

(56) References Cited

U.S. PATENT DOCUMENTS 3,740,421 A    6/1973  Schmolka et al.
3,897,308 A    7/1975  Li et al.
(Continued)

FOREIGN PATENT DOCUMENTS

CN    101267875 A    9/2008
CN    103721572 A    4/2014
(Continued)

OTHER PUBLICATIONS

Wang et al., Bio-Inspired Aquaporinz Containing Double-Skinned Forward Osmosis Membrane Synthesized through Layer-by-Layer Assembly, 5 Membranes 369, 369-384 (2015). (Year: 2015).*
(Continued)

*Primary Examiner* — Ekandra S. Miller-Cruz
(74) *Attorney, Agent, or Firm* — Clark & Elbing LLP

(57) ABSTRACT

The present invention relates to self-assembled nanostructures comprising polyalkyleneimine (PAI) and a detergent solubilized transmembrane protein, such as an aquaporin protein.

6 Claims, 3 Drawing Sheets

Schematic description of coating protocol applied for 0.6 m² modules

(51) Int. Cl.
  *B01D 61/02* (2006.01)
  *B01D 69/12* (2006.01)
  *B01D 69/14* (2006.01)
  *B01D 71/56* (2006.01)

(52) U.S. Cl.
  CPC .......... *B01D 69/144* (2013.01); *B01D 61/025* (2013.01); *B01D 71/56* (2013.01)

(58) Field of Classification Search
  CPC .. B01D 71/56; B01D 69/125; B01D 61/0022; B01D 61/243; B01D 67/00931; B01D 69/1213; B01D 2325/34; Y02A 20/131; B82Y 30/00; B82Y 40/00; A61M 1/3496; C02F 1/441; F03G 7/04
  USPC ........................................................ 210/650
  See application file for complete search history.

(56) References Cited

U.S. PATENT DOCUMENTS

| | | |
|---|---|---|
| 4,360,448 A | 11/1982 | Li et al. |
| 5,229,004 A | 7/1993 | Skelland |
| 5,401,410 A | 3/1995 | Bell et al. |
| 7,014,531 B2 | 3/2006 | Hansen |
| 7,208,089 B2 | 4/2007 | Montemagno et al. |
| 7,424,485 B2 | 9/2008 | Kristiansen et al. |
| 7,857,978 B2 | 12/2010 | Jensen et al. |
| 8,123,948 B2 | 2/2012 | Jensen |
| 9,278,316 B2 | 3/2016 | Vissing et al. |
| 9,359,230 B2 | 6/2016 | Montemagno et al. |
| 10,011,692 B2 | 7/2018 | Vogel et al. |
| 10,293,094 B2 | 5/2019 | Larsen et al. |
| 10,434,480 B2 | 10/2019 | Mentzel et al. |
| 2001/0046564 A1 | 11/2001 | Kotov |
| 2006/0014013 A1 | 1/2006 | Saavedra et al. |
| 2006/0062982 A1* | 3/2006 | Hammond Cunningham ............. H01M 50/46 428/220 |
| 2009/0007555 A1 | 1/2009 | Jensen |
| 2009/0120874 A1 | 5/2009 | Jensen et al. |
| 2010/0196203 A1 | 8/2010 | Sanghera et al. |
| 2011/0020950 A1 | 1/2011 | Vogel et al. |
| 2011/0046074 A1* | 2/2011 | Kumar .................. B01D 71/78 514/21.2 |
| 2011/0084026 A1 | 4/2011 | Freger et al. |
| 2012/0080377 A1 | 4/2012 | Jensen et al. |
| 2012/0152841 A1 | 6/2012 | Vissing et al. |
| 2012/0255862 A1 | 10/2012 | Dunnam et al. |
| 2013/0112618 A1* | 5/2013 | Diallo .................... B01D 69/12 210/500.33 |
| 2013/0192459 A1 | 8/2013 | Wessling et al. |
| 2013/0277307 A1 | 10/2013 | Jensen et al. |
| 2014/0332468 A1* | 11/2014 | Tang .................. B01D 67/0006 210/490 |
| 2015/0136690 A1 | 5/2015 | Xie et al. |
| 2015/0273407 A1 | 10/2015 | Gil et al. |
| 2015/0360183 A1 | 12/2015 | Jensen et al. |
| 2019/0184344 A1 | 6/2019 | Mentzel et al. |

FOREIGN PATENT DOCUMENTS

| | | |
|---|---|---|
| CN | 105013334 A | 11/2015 |
| JP | H06-254158 A | 9/1994 |
| JP | 2006-512204 A | 4/2006 |
| JP | 2012-516776 A | 7/2012 |
| JP | 2012-529984 A | 11/2012 |
| RU | 2569590 C2 | 11/2015 |
| TW | 201440881 A | 11/2014 |
| WO | WO-87/02380 A1 | 4/1987 |
| WO | WO-00/29337 A1 | 5/2000 |
| WO | WO-2006/122566 A2 | 11/2006 |
| WO | WO-2007/033675 A1 | 3/2007 |
| WO | WO-2009/076174 A1 | 6/2009 |
| WO | WO-2010/146365 A1 | 12/2010 |
| WO | WO-2013/043118 A1 | 3/2013 |
| WO | WO-2014/108827 A1 | 7/2014 |
| WO | WO-2014/128293 A1 | 8/2014 |
| WO | WO-2015/124716 A1 | 8/2015 |
| WO | WO-2015/166038 A1 | 11/2015 |

OTHER PUBLICATIONS

Wang et al., Layer-by-Layer Assembly of Aquaporin Z-Incorporated Biomimetic Membranes for Water Purification, 49 Environ. Sci. Technol. 3761, 3761-3768 (2015). (Year: 2015).*
Cath et al., "Forward Osmosis: Principles, Applications, and Recent Developments," J. Membrane Sci. 281(1-2):70-87 (2006).
Deamer and Bangham, "Large Volume Liposomes by an Ether Vaporization Method," Biochim Biophys Acta 443(3): 629-34 (1976).
Gonen and Walz, "The Structure of Aquaporins," Q Rev Biophys. 39(4):361-96 (2006).
Hansen et al., "Formation of giant protein vesicles by a lipid cosolvent method," Chembiochem. 12(18):2856-62 (2011).
Hansen et al., "Large Scale Biomimetic Membrane Arrays," Anal Bioanal Chem. 395(3):719-727 (2009).
Hunter and Frisken, "Effect of Extrusion Pressure and Lipid Properties on the Size and Polydispersity of Lipid Vesicles," Biophys J. 74(6):2996-3002 (1998).
International Search Report for International Patent Application No. PCT/EP2017/052567 mailed Apr. 11, 2017 (4 pages).
James-Smith et al., "Role of ethylene oxide and propylene oxide groups of pluronics in binding of fatty acid to pluronics in microemulsions," J Surfact Deterg. 11(3):237-242 (2008).
Judge and Bever, Jr., "Potassium Channel Blockers in Multiple Sclerosis: Neuronal KV Channels and Effects of Symptomatic Treatment," Pharmacol Ther. 111(1):224-259 (2006).
Karlsson et al., "Reconstitution of Water Channel Function of an Aquaporin Overexpressed and Purified from *Pichia pastoris*," FEBS Lett. 537(1-3):68-72 (2003).
Laboratory of Membrane Processes Slovakia, "Available Equipment," <http://sschi.chtf.stuba.sk/MembraneLab/Equipment.htm>, accessed on Dec. 15, 2011 (6 pages).
Maurer et al., "Spontaneous Entrapment of Polynucleotides Upon Electrostatic Interaction with Ethanol-Destabilized Cationic Liposomes," Biophys J. 80(5):2310-2326 (2001).
Mayer et al., "Vesicles of Variable Sizes Produced by a Rapid Extrusion Procedure," Biochim Biophys Acta. 858(1):161-168 (1986).
McGinnis and Elimelech, "Energy Requirements of Ammonia-Carbon Dioxide Forward Osmosis Desalination," Desalination. 207(1-3):370-382 (2007).
Mui et al., "Osmotic Properties of Large Unilamellar Vesicles Prepared by Extrusion," Biophys J. 64(2):443-453 (1993).
Schiermeier, "Special Report: Purification With a Pinch of Salt," Nature. 452:260-261 (2008).
Sun et al., "A layer-by-layer self-assembly approach to developing an aquaporin-embedded mixed matrix membrane," RSC Adv. 3(2): 473-481 (2013).
Szoka, Jr. and Papahadjopoulos, "Comparative Properties and Methods of Preparation of Lipid Vesicles (Liposomes)," Ann Rev Biophys Bioeng. 9:467-508 (1980).
Wang et al., "Characterization of novel forward osmosis hollow fiber membranes," *J Membrane Sci.* 355(1-2):158-167 (2010).
Wang et al., "Layer-by-layer assembly of aquaporin Z-incorporated biomimetic membranes for water purification," Environ Sci Technol. 49(6): 3761-3768 (2015).
Search Report for Russian Application No. 2018130885, dated Jun. 25, 2020 (3 pages).
Shim et al., "Nanostructured thin films made by dewetting method of layer-by-layer assembly," Nano Lett. 7(11): 3266-73 (2007).

* cited by examiner

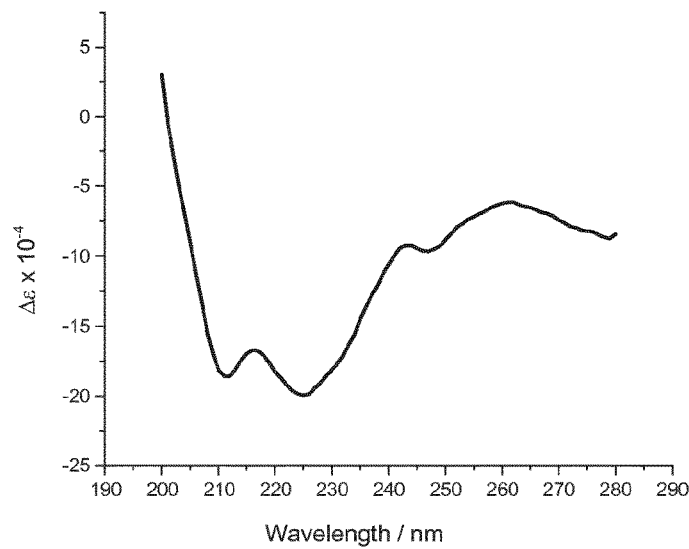
Figure 1. Circular dichroism profile of AQPZ into PEI self-assembled nanostructures
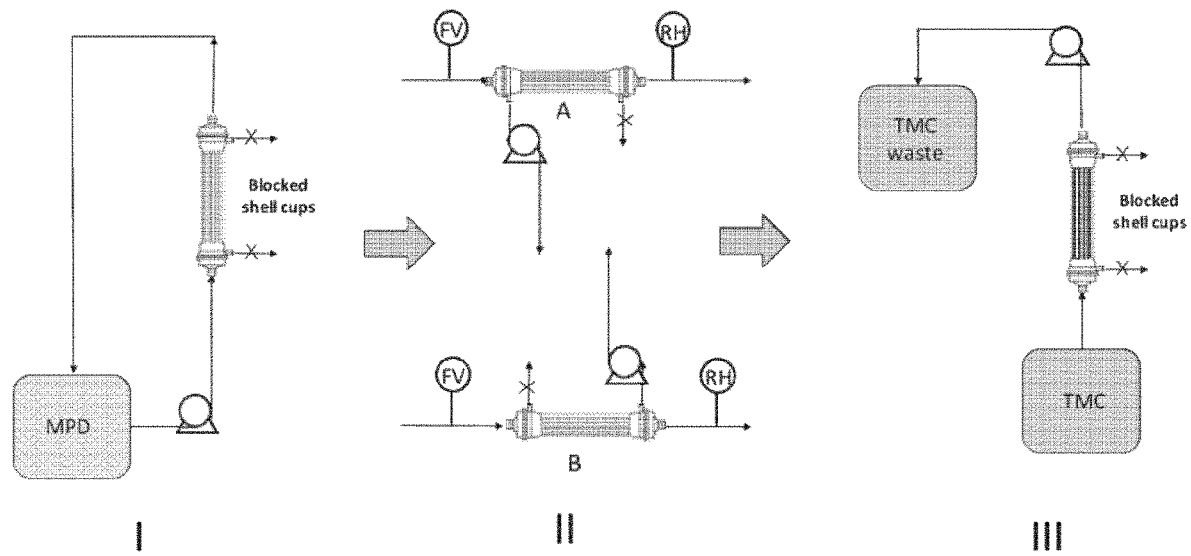
Figure 2. Schematic description of coating protocol applied for 0.6 m² modules

SELF-ASSEMBLED NANOSTRUCTURES AND SEPARATION MEMBRANES COMPRISING AQUAPORIN WATER CHANNELS AND METHODS OF MAKING AND USING THEM

FIELD OF THE INVENTION

The present invention relates to self-assembled nanostructures formed between transmembrane proteins, such as aquaporin water channels (AQPs), and polyalkyleneimines (PAI), and to filtration membranes comprising the nanostructures. The present invention further relates to methods of making the nanostructures and separation membranes, such as hollow fibers and hollow fiber modules, and to their uses.

BACKGROUND OF THE INVENTION

The use of amphiphilic lipids and block copolymers for forming self-assembled vesicles having bilayer or bilayer-like structures is well known in the art, in particular for immobilising amphiphilic membrane proteins, such as aquaporin water channels (AQPs). Vesicles comprising AQPs can then be used to make membranes having immobilised AQPs for applications such as the purification of water (WO2006/122566) or the generation of salinity power (WO2007/033675), in general by depositing the vesicles as a layer or in a film on a supporting substrate, which allows the selective passage of water molecules through the membranes by nanofiltration, reverse osmosis, forward osmosis or pressure retarded osmosis.

WO2013/043118 discloses thin film composite (TFC) membranes in which aquaporin water channels (AQPs) are incorporated in the active layer of the membrane. In addition, it discloses a method of producing thin film composite membranes and their uses in filtration processes, such as nanofiltration and osmotic filtration processes. The TFC membranes comprise lipid-AQP/copolymer-AQP vesicles that are incorporated in the TFC active layer. WO2010/146365 describes preparation of TFC-aquaporin-Z (AqpZ) filtration membranes that use an amphiphile triblock copolymer as a vesicle forming substance for incorporating immobilised AQPs. WO2014/108827 discloses a hollow fiber (HF) module having fibers modified with a thin film composite (TFC) layer comprising aquaporin water channels in which the aquaporin water channels are incorporated in vesicles before incorporation into the TFC layer.

However, typically in the prior art, the amphiphilic lipids and block copolymers used in vesicle production are solids that need to be dissolved in harsh solvents, such as tetrachloromethane ($CCl_4$) or chloroform ($CHCl_3$), to solubilize their predominantly hydrophobic portions. In the membrane synthesis, this solvent is evaporated to allow film formation which is then rehydrated to bring the amphiphile into various emulsion forms (such as vesicles), with simultaneous incorporation of the AQP membrane protein. However, in practice, it is often difficult to control the final vesicle size, resulting in disperse emulsions having vesicles ranging in diameter of from about 60 to 80 nm to about 1000 nm or more. There may also be limits to the number of AQPs that can be incorporated in each vesicle, because the membrane proteins need to be aligned according to their amphiphilic structure in the bilayer structure and to match the thickness of the hydrophobic part of the protein and vesicle membrane.

Polyethylenimine (PEI) is known as a versatile vector for gene transfer into cells because it has a high cationic density that enables it to form complexes with negatively charged DNA. In this application, the PEI-DNA complexes provide a stable environment for the DNA against enzymatic degradation, for example providing a physical barrier to the enzymes or by the electrostatic interactions between the PEI and the enzyme (Thomas & Venkiteswaran, Biophysical Journal, 106(2): 276-277, 2014). PEI exist both in linear, branched and dendritic forms. The linear chains have secondary amine groups while the branched chains or dendrimers may have primary, secondary and tertiary amine groups. It is also known from the literature that short polyethyleneimine (PEI, Mw 600) has been selected as a cationic backbone to which lipid tails conjugate at various levels of saturation. In solution these polymer-lipid hybrids self-assemble to form nanoparticles capable of complexing siRNA. The complexes silence genes specifically and with low cytotoxicity (Schroeder A, et al., J. of Controlled Release, 160(2): 172-176, 2012).

SUMMARY OF THE INVENTION

Broadly, the present invention relates to the use of polyalkyleneimines (PAI), such as polyethyleneimine (PEI), to form self-assembled nanostructures with transmembrane proteins, or certain types of integral membrane proteins (pore proteins), such as aquaporin water channels. The PAI-protein nanostructures may then be used in the production of separation membranes in which the transmembrane proteins are immobilized and active, for example for allowing water molecules to pass through the membrane. For example, for the production of separation membranes comprising the transmembrane proteins, the self-assembled nanostructures may be suspended in an aqueous liquid composition that can be included in an interfacial polymerization reaction on a semipermeable support to form a thin film composite active membrane layer, or the self-assembled nanostructures may be incorporated in a filtration membrane formed by the layer-by-layer technique or other types of filtration membranes having an active selective layer. Without wishing to be bound by any particular theory, it is believed that the self-assembled nanostructures form through electrostatic interaction between positively charged nitrogen atoms present in the polyalkyleneimine molecules and amino acid residues in the transmembrane protein that are negatively charged under the conditions (pH, pKs etc.) used to form the nanostructures and/or the membranes comprising the nanostructures.

Accordingly, the self-assembled nanostructures of the present invention differ from the vesicles in the prior art in which membranes comprising transmembrane proteins are immobilized in lipid bilayer or bilayer-like structures in which the proteins are incorporated in the bilayers of individual vesicles or cells or else are incorporated in the boundary layer between adjacent cells in a liquid membrane. In both instances, the bilayer has the function of separating an internal phase within the cells from a surrounding external phase in which the cells are suspended. In contrast, in the self-assembled nanostructures of the present invention, the transmembrane protein molecules and the polyalkyleneimine molecules associate or form a complex in a way that substantially does not lead to a boundary layer that leads to distinct internal and external phases, but rather provides a composition of nanostructures that can be deposited or otherwise provided as an active layer and/or selective structure of a separation membrane.

Accordingly, in one aspect, the present invention provides self-assembled nanostructures formed between positively charged polymers such as polyalkyleneimines (PAI), such as polyethyleneimine (PEI), and one or more transmembrane proteins, such as AQPs, and especially transmembrane proteins being detergent solubilized. The transmembrane protein has negatively charged amino acid residues available for complex formation or a charge interaction with the positively charged polymers to form aggregates, for example through electrostatic interactions. More particularly, it has been found that the size of the formed nanostructures is dependent of the molecular structure and the molecular weight of the PAI (or PEI) polymer and the ratio of polymer to protein used.

Therefore, the present invention provides separation membranes, such as filtration membranes or TFC membranes, having AQPs incorporated in the active layer to facilitate water transport, where the AQPs are immobilised into self-assembled PAI nanostructures, such as self-assembled PEI nanostructures. The present invention further provides liquid compositions comprising the PAI-protein nanostructures which can be incorporated in the active layer of various separation membranes (including filtration membranes), such as nanofiltration membranes, forward osmosis membranes and reverse osmosis membranes.

In a further aspect, the present invention provides a hollow fiber (HF) module having fibers modified with a selective layer comprising the self-assembled nanostructures of the present invention. Conveniently, the selective layer comprises a thin film composite (TFC) layer on the inside surface of the fibers, although in certain embodiments, the TFC layer may be formed on the outside of the fibers.

In a related aspect, the present invention provides a method of preparing a hollow fiber (HF) module comprising a bundle of fibers surrounded by a protective shell, wherein the fibers are modified with a selective layer comprising the self-assembled nanostructures of the present invention, the method comprising contacting the fibers with a liquid composition comprising the self-assembled nanostructures and reacting the liquid composition in an interfacial polymerization reaction to form the selective layer comprising the self-assembled nanostructures. The method may additionally comprise adding the liquid composition during formation of the active layer by the layer-by-layer deposition method. The method can be used to form selective layers on various other membrane forms, such as flat sheet membranes and tubular membranes.

In HF modules, the protective shell typically has an elongate form, with bundle of fibers longitudinally arranged inside the protective shell. The experiments set out in the examples demonstrate that applying a vacuum to the shell side of the module represents an advantage in a TFC coating method. In addition, it may be a further advantage for the protective shell to be held in a substantially horizontal orientation during the aqueous phase drying. Advantages of applying said vacuum include uniform drying of the membrane surface from water phase along the module length before introduction of the organic phase and/or a reduction or prevention of the gravimetrical flow of the aqueous phase on the shell side of the module on the outer surface of the fibers inside the shell.

In a further aspect, the present invention provides the use of an HF module of the present invention for extraction of pure water through forward osmosis.

In a further aspect, the present invention provides the use of an HF module of the present invention for re-extraction of pure water from a patient's plasma lost through hemodialysis, hemodiafiltration or hemofiltration, for example in the manner disclosed in WO2015/124716.

In a further aspect, the present invention provides the use of an HF module of the present invention for up-concentration of heavy water fractions from a natural water source.

Various aspects of the invention employ a hollow fiber (HF) module having hollow fiber membranes modified with a selective layer comprising self-assembled nanostructures formed by self-assembly of polyalkyleneimine (PAI), such as PEI, and a detergent solubilized transmembrane protein. Generally, the PEI is a substantially linear polymer having an average molecular weight of between about 2,000 Da to about 10,000 Da, such as between about 3,000 Da to about 5,000 Da; and the transmembrane protein is an aquaporin water channel; and the detergent is selected from the group consisting of LDAO, OG, DDM or a combination thereof; and where the selective layer comprises a thin film composite (TFC) layer formed on the inside surface of the fibers through an interfacial polymerisation reaction; and where the TFC layer comprises aquaporin water channels that are functionally encapsulated in PAI or PEI nanostructures or the aquaporin water channels are incorporated in amphiphilic vesicles, such as diblock or triblock copolymer vesicles, as described in Example 11 below, or lipid vesicles; and where said HF modules are coated using the method described herein.

Furthermore, when said transmembrane protein comprises an ion channel or an aquaporin or the like, and said nanostructures comprising said transmembrane protein are immobilized or incorporated in said active or selective layer, it becomes feasible to manufacture separation membranes or filtration membranes having diverse selectivity and transport properties, e.g. ion exchange membranes when said transmembrane protein is an ion channel, or water filtration membranes when said transmembrane protein is an aquaporin. As the transmembrane protein maintains its biologically active folded structure when complexed into the self-assembled nanostructures and is shielded from degradation, even sensitive amphiphilic proteins may become sufficiently stable when processed into separation membranes in lab and industrial scale and hence preserve their functionality.

Moreover, the present invention relates to a liquid composition comprising a self-assembled nanostructure, wherein the transmembrane protein is an aquaporin water channel as described above, optionally comprising a buffer, and a method of making the liquid composition in which a solution of polyalkyleneimine is mixed with a detergent solubilized transmembrane protein to form a liquid formulation that is stable, even at room temperature and above. The liquid composition form is particularly useful as an intermediate that may be added into an MPD solution or otherwise applied during the membrane fabrication process, such as during an interfacial polymerization forming a TFC layer. A special feature of the present invention is that the PAI nanostructures may be able to participate in said interfacial polymerization as described below, and, thus, reinforce the thin film and the immobilization of aquaporin water channels therein (Kah et al., pH stable thin film composite polyamine nanofiltration membranes by interfacial polymerisation; Journal of Membrane Science, 478: 75-84, 2015).

The separation membranes of the present invention are useful in a method of preparing a pure water filtrate, such as filtering an aqueous solution through a separation membrane in a nanofiltration process, in a forward osmosis process, or in a reverse osmosis process.

In addition, the separation membrane of the present invention is useful in a method for the concentration of a product solution, said method comprising utilizing a separation membrane of the invention mounted in a filter housing or module to extract water from the product solution, e.g. by forward osmosis, thus creating a product solution having higher end concentration of desirable solutes therein.

The separation membranes of the present invention may additionally be useful in a method for the production of salinity power using pressure retarded osmosis, said method comprising utilizing said separation membrane to increase hydrostatic pressure, and using the increase in hydrostatic pressure as a power source, cf. WO2007/033675 and WO2014128293 (A1).

Embodiments of the present invention will now be described by way of example and not limitation with reference to the accompanying examples and figures. However, various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

BRIEF DESCRIPTION OF THE FIGURES

FIG. 1. Circular dichroism profile of AQPZ into PEI self-assembled nanostructures. The secondary structure of AQPZ. FIG. 1 reconstituted into PEI self-assembled nanostructures showed a negative ellipticity band at 222 nm compared to 208 nm (222/208 nm ratio equal to 1.15), similar as reported for spinach aquaporin reconstituted in *E. coli* total lipids, indicating that the protein in not unfolded. (Hansen et al., Biochimica et Biophysica Acta, 1808: 2600-2607, 2011).

FIG. 2. Schematic figure showing a coating protocol for the self-assembled nanostructures of the present invention applied to hemofiltration (HF) modules as described in Example 11. I—MPD-water wetting, IIA—module drying from side 1, IIB—module drying from side 2, III—reaction with TMC-isopare. FV-flow meter, RH-humidity sensor.

DETAILED DESCRIPTION OF THE INVENTION

Figure 3:
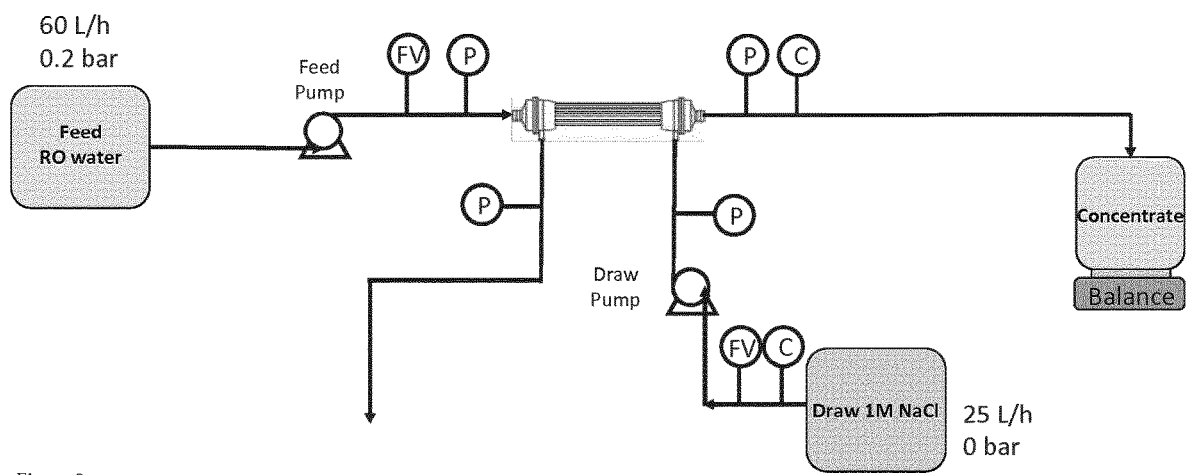
FIG. 3. A schematic description of the applied LPRO setup used in testing of 2.3 m2 modules FV-flow meter, P-manometer, C-conductivity meter.

More specifically, the invention relates to self-assembled nanostructures as disclosed herein, which nanostructure is formed by self-assembly of the positively charged PEI in presence of the protein when being negatively charged.

Examples of transmembrane proteins are integral membrane proteins including aquaporin water channels. i.e. aquaporins and aquaglyceroporins, such as those listed below. At pH 7.5 the protein is negatively charged as proved when reconstituted inside proteoliposomes that will exhibit a negative value of their zeta potential value (Wang S et al., Membranes, 5(3): 369-384, 2015). This is due to the presence of negatively charged amino acid residues (aspartic acid and glutamic acid) with pKa at 3.9 for aspartic acid and 4.2 for glutamic acid (Kong S et al. RSC Adv., 4: 37592-37599, 2014). In addition, these proteins have a cysteine residue situated at the exterior surface when properly folded, said cysteine being negatively charged at pH 7.5 inducing also a negative value of the zeta potential as has been shown for 1,2-diphytanoyl-sn-glycero-3-phosphocholine (DPhPC) proteoliposomes containing AqpZ (Li et al., Fusion behaviour of aquaporin Z incorporated proteoliposomes investigated by quartz crystal microbalance with dissipation (QCM-D); Colloids and Surfaces B-biointerfaces, 111: 446-452, 2013).

The present invention also relates to a liquid composition comprising a self-assembled nanostructure as disclosed herein in which the transmembrane protein is detergent solubilized, for example using a suitable detergent such as LDAO, OG, DDM or the like, optionally in combination with a pH buffer to maintain negatively charged amino acid residues of said transmembrane protein, e.g. for aquaporins buffering above pH 4, using e.g. a phosphate buffer, corresponding to the pKa of negatively charged amino acid residues. Other optional components of the liquid composition are biological buffer, e.g. HEPES sodium salt, cf. 54466 HEPES sodium salt from Fluka, (Industriestrasse 25, CH-9471 Buchs), Tris buffer, TES, MES, and MOPS buffers.

In addition, the present invention relates to a method of making the liquid composition as disclosed, where, as an example, a solution of a PAI, such as polyethyleneimine (PEI), is mixed with a suspension of negatively charged protein having a negatively charged amino acid residue. In this way structures are formed when the PEI solution complexes the charged protein as has been shown for PEI DNA and PEI RNA complexes (Sun et al., Molecular Dynamics Simulations of DNA/PEI Complexes: Effect of PEI Branching and Protonation State, Biophysical Journal Volume 10 Jun. 2011 2754-2763; Mansoor M Amiji Polymeric Gene Delivery: Principles and Applications. Examples of PEIs are linear and branched polymers as outlined below.

Moreover, the present invention relates to a separation membrane, such as in the form of a semipermeable or selectively permeable membrane, comprising self-assembled nanostructures as disclosed herein. The separation membrane may be in the form of a filtration membrane comprising a porous substrate or support membrane, e.g. a nanoporous or microporous membrane having a separation layer or an active layer in which the self-assembled nanostructures are immobilized. In some case, the porous support layer may further be reinforced by being cast on a woven or non-woven sheet, e.g. formed from polyester fibers.

As an example said active layer may be a water selective layer formed by interfacial polymerization to form a thin film or TFC layer, e.g. a crosslinked aromatic polyamide layer, or the active/selective layer may be formed by depositing nanosized alternating positive and negatively charged polyelectrolyte layers, i.e. a layer-by-layer film (LbL) (see Wang et al., Membranes, 5(3): 369-384, 2015).

The filtration membrane according to the present invention may be prepared by adding a liquid composition comprising said self-assembled nanostructures, e.g. with aquaporin water channel proteins as the transmembrane protein needed to form structures, during the membrane fabrication process, such as adding the liquid composition to the MPD solution when forming a TFC layer, or by addition to a liquid positively charged polyelectrolyte when forming an LbL skin.

In one aspect of the process of the invention, the transmembrane protein may be an anion channel protein, such as a voltage-dependent anion channel, which is useful in preparation of ion exchange membranes for reverse electrodialysis, cf. Dlugolecki et al. (Journal of Membrane Science, 319 214-222, 2008).

Definitions and Terms

The term "transmembrane protein" (TP) as used herein is a type of membrane protein spanning the entirety of the biological membrane to which it is permanently attached in nature. That is, in nature, transmembrane proteins span from one side of a membrane through to the other side of the membrane. Examples of transmembrane proteins are ammonia transporters, urea transporters, chloride channels, and aquaporin water channels.

The term "aquaporin water channel" as used herein includes a functional natural or synthetic aquaporin or aquaglyceroporin water channel, such as aquaporin Z (AqpZ), GIPf, SoPIP2;1, aquaporin 1 and/or aquaporin 2. Aquaporin water channels include bacterial aquaporins and eukaryotic aquaporins, such as yeast aquaporins, plant aquaporins and mammalian aquaporins, such as aquaporins 9 and 12 as well as related channel proteins, such as aquaglyceroporins. Examples of aquaporins and aquaglyceroporins include: prokaryotic aquaporins such as AqpZ; mammalian aquaporins, such as Aqp1 and Aqp2; plant aquaporins, such as plasma intrinsic proteins (PIP), tonoplast intrinsic proteins (TIP), nodulin intrinsic proteins (NIP) and small intrinsic proteins (SIP), e.g. SoPIP2;1, PttPIP2;5 and PtPIP2;2; yeast aquaporins, such as AQY1 and AQY2; and aquaglyceroporins, such as GlpF and Yfl054. Aquaporin water channel proteins may be prepared according to the methods described herein or as set out in Karlsson et al. (FEBS Letters 537: 68-72, 2003) or as described in Jensen et al. US 2012/0080377 A1 (e.g. see Example 6).

The terms "separation membrane" as used herein includes membranes of flat sheet, tubular or hollow fiber structures useful for separating water and, optionally, certain small size solutes including anions and cations, from other solutes, particles, colloids and macromolecules. Examples separation membranes are "filtration membranes" such as nanofiltration (NF) membranes, forward osmosis (FO) membranes and reverse osmosis (RO) membranes. One type of filtration membranes is a "thin film composite" (or TFC) membrane, often classified as nanofiltration and reverse osmosis membrane. TFC flat sheet membranes are typically made by forming a polyamide layer through interfacial polymerization on top of a polyethersulfone or polysulfone porous layer which has been cast top of a non-woven or woven fabric support. Examples of methods of making a TFC layer on the inside or outside surface of hollow fibers is disclosed in WO2014/108827 incorporated herein by reference. The polyamide rejection layer is formed through interfacial polymerization of an aqueous solution of an amine with a solution of an acid chloride in an organic solvent. TFC membranes may be produced as described in WO 2013/043118 (Nanyang Technological University & Aquaporin A/S). Another type of filtration membranes are those formed by the layer-by-layer (LbL) deposition method, such as described in Gribova et al. (Chem. Mater., 24: 854-869, 2012) and Wang et al. (Membranes, 5(3): 369-384, 2015). For example, the self-assembled nanostructure may be embedded or incorporated in the polyelectrolyte multilayer (PEM) films, as outlined in FIG. 4 of Gribova et al. (2012). Polyelectrolyte Multilayer Assemblies on Materials Surfaces: From Cell Adhesion to Tissue Engineering. Chemistry of Materials: A Publication of the American Chemical Society, 24(5), 854-869. doi.org/10.1021/cm2032459.

HF modules are known in the art and generally have polyethersulfone (PES) fibers or fibers of other suitable porous support material, such as polysulfone, polyphenylene sulfone, polyether imide, polyvinylpyrrolidone and polyacrylonitrile including blends and mixtures thereof, which has been modified by forming a thin film composite layer, e.g. through interfacial polymerization. In addition, various doping materials may be used when manufacturing the hollow fiber support materials. Such HF modules are commonly used in food and beverage applications such as filtering beer and wine, in some water and wastewater applications including wastewater reuse and pool water recycling and for hemodialysis. For instance, the German company Membrana supplies a hollow fiber module containing several thousands of fibers with an overall surface area of 75 square meters per module. Smaller modules with typically 1-2 square meters and around 8,000 to 20,000 fibers are commonly used in medical dialysis applications (Fresenius Medical Care, Gambro). HF modules for use in the method of the invention are typically microfiltration modules or nanofiltration modules having a molecular weight cut-off range of from 20 to 50 kDa. or such as from 30 to 40 kDa. In principle, all these commercial products can be coated through interfacial polymerization with the self assembled nanostructures or compositions of the present invention, for example resulting in a thin film composite layer wherein aquaporin water channels are incorporated. The housing material of the HF modules of the invention can be any suitable material commonly used for HF modules, such as polycarbonate, polysulfone, POM (all of which are transparent), or polypropylene, polyethylene, PVDF and stainless steel can be used. The fibers may be sealed into the HF module housing using commonly known polyurethanes or epoxy adhesive materials and the like. Tubular modules may also be coated in the same way, such as modules described in synderfiltration.com/learning-center/articles/module-configurations-process/tubular-membranes/

Additional examples of HF modules that may be TFC modified according to the invention are found on websites of membrane producers, such as:
  membranafiltration.com/filtration-modules/documentation.cfin
  kochmembrane.com/PDFs/
    KMS_Puron_Hollow_Fiber_PSH300_PSH600_
    PSH1800_Modul.aspx
  kochmembrane.com/Membrane-Products/Hollow-Fiber/
    Ultrafiltration/PURON-Series.aspx
  daicen.co.jp/english/membrane/kogata.html
  spectrumlabs.com/filtration/hfinods.html
  microdyn-nadir.com/en/Products/

"Thin-film-composite" or "TFC" membranes as used herein may be prepared using an amine reactant, preferably an aromatic amine, such as a diamine or triamine, e.g., 1,3-diaminobenzene (m-Phenylenediamine, >99%, e.g. as purchased from Sigma-Aldrich) in an aqueous solution, and an acyl halide reactant also known herein as an amine-reactive molecule, such as a di- or triacid chloride, preferably an aromatic acyl halide, e.g. benzene-1,3,5-tricarbonyl chloride (CAS No. 84270-84-8, trimesoyl chloride (TMC), 98%, e.g. as purchased from Sigma-Aldrich) dissolved in an organic solvent where said reactants combine in an interfacial polymerization reaction, cf. U.S. Pat. No. 4,277,344 which describes in detail the formation of a composite membrane comprising a polyamide laminated to a porous membrane support, at the surface of the support membrane, e.g. a polyethersulfone membrane. Benzene-1,3,5-tricarbonyl chloride is dissolved in a solvent, such as a $C_6$-$C_{12}$ hydrocarbon including hexane (>99.9%, Fisher Chemicals), heptane, octane, nonane, decane etc. (straight chain or branched hydrocarbons) or other low aromatic hydrocarbon solvent, e.g. Isopar™ G Fluid which is produced from petroleum-based raw materials treated with hydrogen in the presence of a catalyst to produce a low odour fluid the major components of which include isoalkanes. Isopar™ G Fluid: Chemical Name: Hydrocarbons, C10-C12, isoalkanes, <2% aromatics; CAS No: 64742-48-9, chemical name: Naphtha (petroleum), hydrotreated heavy (from ExxonMobil Chemical). Alternatives to the reactant 1,3-diaminobenzene include diamines such as hexamethylenediamine etc., and alternatives to the reactant benzene-1,3,5-tricarbonyl chloride include a diacyl chloride, adipoyl chloride etc. as known in the art. Interestingly, the amine-reactive molecule, such as TMC, may form condensation products or polymers with amine groups in the PAI polymers in an interfacial polymerization reaction, e.g. as described by X. Feng et al. (Journal of Membrane Science, 472: 141-153, 2014) who have shown how successive layers of aromatic polyamide are formed on a PES support in an interfacial polymerization reaction between PEI and TMC to create a nanofiltration membrane.

"Layer-by-layer" or "LbL" deposition method: The sequential layer-by-layer (LbL) adsorption of oppositely charged polyelectrolytes first mentioned in 1966 (Iler, Colloid Sci. 21: 569-594, 1966) is an efficient method for thin film formation and one of the common techniques in material science and engineering (Decher et al., Phys. Chem. 95: 1430-1434, 1991). As the driving force for the formation of polyelectrolyte multilayers is the electrostatic attraction, the LbL technique is suitable for the fabrication of ultra-thin defect free layers with tailored composition and tunable properties (Joseph et al., Polym. Chem. 5: 1817-1831, 2015) with a wide range of applications. One example of tunable properties is the control of the number of the layers, and thus also the control of the total thickness from nm to µm range (Jian et al., Adv. Mater 18: 1068-1072, 2006). LbL polyelectrolyte assembly has been employed for membrane separations, for many porous membrane substrates with different sizes and topology that can adsorb the initial polyelectrolyte layer such as poly(ether sulfone) (PES), poly(vinylamine), poly(4-methyl-1-pentene), polyamide, polyacrylonitrile (PAN), poly(vinyl pyrrolidone), anodic alumina in flat sheet, tubular or hollow fiber structures (Duong et al., J. Memb. Sci. 427: 411-421, 2013). A wide variety of polyelectrolytes may be used to form the multilayers leading to membranes, and the number of bilayer and the support membrane may also be varied, as summarized in the table below (from Table 2.2 in Zhang, Y. (2013) which table i.a. is based on Zhang, P. et al (2008)).

| Bilayer number | Support membrane | Polyelectrolyte pair |
|---|---|---|
| 60 | PAN/PET (Polyethylene terephthalate fleece coated with a thin layer of polyacrylonitrile) | PVA (Poly(vinyl alcohol))/ PVS (Poly(vinyl sulfonic acid)) |
| 20 | Polyimide | PEI (Polyethyleneimine)/Alginate |
| 10.5 | Alumina | BDPA (1,3-bis diphenylene-2-phenyl allyl)/DABA (3,5-Diaminobenzoic acid)/PAH (poly(allylamine hydrochloride)) |
| 10 | PAN (polyacrylonitrile) | PEI/PAA (poly(acrylic acid)) |
| 4 | PES (poly(ether sulfone)) | PAA/PEI |
| 2.5 | PAN (polyacrylonitrile) | PEI/PAA |

The term "polyalkylimine" (PAI) includes any oligomer or polymer, or mixture thereof, which is made by polymerization of an alkylimine monomer having at least one "imine" group (—N(H)—) incorporated therein. In one embodiment, the polyalkylimine is an amine containing polymer comprising alkyl- or alkenyl-derived units (such as $C_2$-$C_8$ alkyl- or alkenyl-derived units) in the backbone. Preferably, the PAI comprises imine-derived units (amine groups) and alkyl-derived units, and most preferably, the PAI consists of amine groups and alkyl-derived units. Preferably, the PAI is selected from the group consisting of poly(ethyleneimine), poly(propyleneimine), poly(propyl-co-ethyleneimine), poly(allylamine), and mixtures thereof. In any case, the PAI preferably has a weight average molecular weight ($M_w$) of about 500 or about 1,000 or higher, such as about 2,000 or 3,000 or 5,000 or 10,000 or 20,000 or 40,000 Da.

The condensation polymers described herein are typically produced in an aqueous solution by combining the amine-reactive molecules with a PAI. Amine-reactive molecules are molecules that include at least one moiety that will react with an amine/imine to form a covalent or ionic chemical bond, preferably covalent. Desirably, there are from 0.1 or 0.2 to 0.6 or 0.8 or 1.0 or 1.1 or 1.2 or 2.0 or 2.5 or 3.0 amine-reactive equivalents ("ARE") of the amine-reactive molecules that are combined with the PAI. Desirably, the product can be isolated from an aqueous diluent in solution or substantially in solution at a pH of at least 8. The product of the condensation reaction between the PAI and amine-reactive molecule is the condensation polymer as described herein, but in certain embodiments it is not necessary to specifically isolate the condensation polymer from the reaction medium, hence, in certain embodiments, the usefulness of the condensation polymer is as the entire mixture or condensation product.

The term "polyethyleneimine" (PEI) as used herein includes a polymer with repeating units composed of —NHCH$_2$CH$_2$— (an amine group and two methylene groups):

Linear polyethyleneimines contain secondary amines, whereas branched polyethyleneimines may contain primary, secondary and tertiary amino groups. Various linear PEI with molecular weight ranging from 1,000 Da or 1,500 Da or 2,000 Da 2500 Da to 4,000 Da or 5000 Da or 8,000 Da or 10,000 Da may be used as well as branched PEI with molecular weights ranging from 800 Da to 2,000 Da. In general, an increase in the branching and molecular weight of the PEI, with lead to an increase in the possible loading of the protein in the structures formed between the PEI and the protein, typically accompanied by size increase of the formed structures. Having in mind that for some applications, such as the production of filtration membranes, the final size of the formed structures should preferably not exceed a maximum of 200 nm the entire library of available PEIs with various molecular weights, linear and branched can be considered. For the PEI-protein complexes a narrow size distribution of around 200 nm (250 to 150 nm) is presently considered the most promising for incorporation into the active layer of filtration. For producing filtration membranes by the LbL method, the formed structures may preferably be less than 200 nm, such as less than 100 nm, such as less than 50, 20, or 10 nm—all depending on the number of layers formed, the dimensions of the transmembrane protein's folded structure and the position(s) of the formed structures in the active layer.

Presently, 4000, 5000, and 10000 branched (side groups+ more available positive charges) function well. All functional polymers have positive charges concentration dependent in accordance with the literature and observations. The more negative the self-assembled structures the larger the structures as measured by DLS. LDAO is very dilute and has negative charge as measured by zeta potential. Aggregate protein structures have not been seen where the zeta potential would fall to about minus 30. A colloidal system where structures are sustained in suspension.

The abbreviation $M_n$ means number average molecular weight. It means the total weight of polymer divided by the number of polymer molecules. Thus, $M_n$ is the molecular weight weighted according to number fractions. The abbreviation $M_w$ means weight average molecular weight. The molecular weight weighted according to weight fractions. Molecular mass may be measured by gel permeation chromatography (GPC) in tetrahydrofuran. Polydispersity index defined as $M_n/M_w$ will be determined from the elution curves obtained in GPC.

Size of the nanostructures: Preferably, the nanostructures of the present invention have a particle size of between about 10 nm diameter up to 200 nm to about 250 nm diameter depending on the precise components of the nanostructures and the conditions used for their formation. It will be clear to those skilled in the art that a particle size refers to a range of sizes and the number quoted herein refers to the average diameter, most commonly mean hydrodynamic diameter of that range of particles. The nanostructure compositions of the present invention comprise nanoparticles having mean diameters of from about 250 nm to about 200 nm or less, in some cases mean diameters that are less than 200 nm such as less than about 180 nm or less than about 150 nm.

Examples of molar ratios of transmembrane protein to PAI (such as PEI) is dependent on the transmembrane protein used, the type of PAI used, the degree or amount of branched PAI as opposed to linear PAI, and the desired size of the nanostructure. As an example, for nanostructures of PEI and aquaporin water channels, the molar ratio of transmembrane protein to PEI may be between 1:200 to 1:2000, such as 1:400 to 1:1500, such as 1:600 to 1:1000.

Examples of linear polyethyleneimines that may be used in accordance with the present invention include: Polyethylenimine, linear, 764582 ALDRICH, (average $M_n$ 5,000, PDI <1.2); Polyethylenimine, linear, 764604 ALDRICH, (average $M_n$ 2,500, PDI <1.2); and Polyethylenimine, linear, 765090 ALDRICH, (average $M_n$ 10,000, PDI≤1.2). Examples of branched polyethyleneimine are: Polyethylenimine, branched, 407819 ALDRICH (average $M_w$ 800 by LS, average $M_n$ 600 by GPC), Polyethylenimine, branched, 408727 ALDRICH (average $M_w$ ~25,000 by LS, average $M_n$ ~10,000 by GPC). Polysciences, Inc is also provider of some linear polyethyleneimines, polyallylamine $M_w$~17,000, 479136 ALDRICH, CAS Number 30551-89-4, Linear Formula [CH2CH(CH2NH2)]n.

BASF Lupasol®, cf product-finder.basf.com/group/corporate/product-finder/de/brand/LUPASOL (accessed on Feb. 8, 2016). Examples of dendritic PEI are: Polyethylene imine dendritic 5000 Da and 25000 Da (Nanopartica) and Polyethylene imine dendritic 5000 Da alkane functionalized (Nanopartica).

The term "self-assembled" as used herein refers to the process by which nanostructures formed from polyalkyleneimine, such as polyethyleneimine, components and transmembrane protein components form organized, ordered structures as a result of the ionic or charged interactions between the components, without external direction. In the present invention, "self-assembled" is synonymous with the term "molecular self-assembly". The general properties of self-assembled systems are described at en.wikipedia.org/wiki/Self-assembly #Interactions [accessed 8 Feb. 2016]. In the present invention, the self-assembled nanostructures formed between polyethyleneimine components and (negatively) charged protein components are believed to be driven by the ionic interactions between the cationically charged polyethyleneimine molecules and anionically charged amino acid residues of the protein component.

The term "nanostructures" as used herein refers to particles having a nanomeric scale, and is not intended to convey any specific shape limitation. In particular, "nanostructure" encompasses nanospheres, nanotubes, nanoboxes, nanoclusters, nanorods, and the like. In certain embodiments, the nanostructures may be nanoparticles and/or nanoparticle cores having a generally polyhedral or spherical geometry.

The term "size" as used herein refers to a hydrodynamic diameter of the self-assembled nanostructures.

EXAMPLES

The present invention is further illustrated with reference to the following non-limiting examples
Experimental Section
Equipment:
  ÂKTA Start FPLC connected with Laptop, using Unicorn operating system.
  Vacuum stream.
  Sterile 0.45 µM vacuum filter cup.
  15 mL PP tubes.
Abbreviations:
  CV: column volume.
  AQP: Aquaporin Z from *E. coli*.
  LDAO: N,N-Dimethyldodecylamine N-oxide (#40234, Sigma).
  PAGE: Polyacrylamide gel electrophoresis.
Materials and Chemicals:
  HisTrap Gel filtration material (Ni Sepharose 6 Fast Flow #17-5318-03, GE Healthcare) packed into a XK16/20 column (GE Healthcare) at known volume or prepacked 1 ml, 5 ml HisTrap column.
  AQP Binding buffer: 20 mM sodium phosphate, 300 mM NaCl, 20 mM imidazole, 10% glycerol, 0.2% LDAO, pH8.0.
  LDAO-free AQP Binding buffer: 20 mM sodium phosphate, 300 mM NaCl, 20 mM imidazole, 10% glycerol, pH8.0.
  Imidazole-free AQP Binding buffer: 20 mM sodium phosphate, 300 mM NaCl, 10% glycerol, 0.2% LDAO pH8.0.

AQP Elution buffer: 20 mM sodium phosphate, 300 mM NaCl, 200 mM imidazole, 10% glycerol, 0.2% LDAO, pH8.0, ddH$_2$O.

General Purification of Aquaporin and Preparation of Aquaporin Stock Solution

Recombinant Production of Aquaporin Z

All types and variants of aquaporin water channel proteins, including aquaglyceroporins, may be used in the manufacture of membranes and compositions according to this invention, cf. methods described in WO2010/146365. Representative examples include the spinach aquaporin SoPIP2;1 protein and the bacterial aquaporin-Z from E. coli.

Functional aquaporin-Z was overproduced in E. coli strain BL21(DE3) bacterial cultures as His-tagged protein with a tobacco etch virus cleavage site. The fusion protein has 264 amino acid and a M$_w$ of 27234 Da. Genomic DNA from E. coli DH5 was used as a source for amplifying the AqpZ gene. The AqpZ gene was amplified using gene specific primers with the addition of a tobacco etch virus cleavage site (TEV); ENLYFQSN at the N-terminus of AqpZ. The amplified AqpZ was digested with the enzyme NdeI and BamHI and then ligated to the similarly digested 6-His tagged expression pET28b vector DNA. The positive clones were verified by PCR-screening. The authenticity of the constructs was then confirmed by DNA sequencing.

The E. coli strain BL21(DE3) was used for expression of the protein. Luria Broth cultures containing 50 μg/ml kanamycin were incubated for 13-16 hours at 37 C, diluted 100-fold into fresh LB broth and propagated to a density of about 1.2-1.5 (OD at 600 nm). Expression of recombinant protein was induced by addition of 1 mM IPTG for 3 hour at 35° C. before centrifugation. Harvested cells were resuspended in ice-cold binding buffer (20 mM Tris pH 8.0, 50 mM NaCl, 2 mM β-mercaptoethanol, 10% glycerol) in the presence of 0.4 mg/ml lysozyme, 50 units Bensonase and 3% n-octyl β-D-Glucopyranoside. The sample was subjected to five times lysis cycles in a microfluidizer at 12,000 Pa. Insoluble material was pelleted by 30 minutes centrifugation at 40,000×g. The supernatant was passed through a Q-Sepharose fast flow column (Amersham Pharmacia), and the flow through was 10 collected. The flow though fraction was topped up with NaCl to 300 mM before loaded onto a pre-equilibrated Ni-NTA column. The column was washed with 100 column volumes of a wash buffer (20 mM Tris pH 8.0, 300 mM NaCl, 25 mM imidazole, 2 mM β-mercaptoethanol, 10% glycerol) to remove non-specifically bound material. Ni-NTA agarose bound material was eluted with five bed volumes of elution buffer (20 mM Tris pH 8.0, 300 mM NaCl, 300 mM imidazole, 2 mM β-mercaptoethanol, 10% 15 glycerol, containing 30 mM n-octyl β-D-Glucopyranoside). AqpZ was further purified with anion exchange chromatography; monoQ column (GE healthcare). The sample mixture was diluted and concentrated to bring the salt and imidazole concentration to approximately 10 mM with Amicon concentrator, membrane cut off 10,000 Da before loading to MonoQ column. The buffer used during anion exchange chromatography were (A) 20 mM Tris pH 8.0, 30 mM OG, 10% glycerol and (B) 20 mM 20 Tris pH 8.0, 1 M NaCl, 30 mM OG, 10% glycerol. The eluted peak fractions containing AqpZ from the ion exchange column was pooled. The purified AqpZ extract was kept frozen at −80° C.

Procedure for Purification of Aquaporin Protein

A batch of frozen extract of aquaporin protein, such as aquaporin Z, AQPZ, e.g. from an E. coli fermentation, was obtained and treated as follows for use in the experiments to produce and characterise membranes comprising protein-PAI nanostructures of the present invention.

One day before the purification experiment, the AQP extract (stored at −80° C. freezer) was thawed on ice or in a 4° C. refrigerator. Portions of the buffers and ddH$_2$O were readied at 4° C. The AQP extract was stirred in an adequate chilled beaker on ice bath by a magnetic stick to dissolve any precipitate. 1.5 volumes of pre-chilled LDAO-free AQP binding buffer was gradually added into 1 volume of the solubilized extract (using a further 0.5 volume buffer for rinsing the extract tubes and filtration cup), mixed well and filtered through a sterile 0.45 μM vacuum filter cup. Vacuum was applied to the filter cup to avoid excess foaming and the filtrate was placed on ice to use within 2 hours.

A Histrap column was equilibrated with sterile water followed by AQP Binding buffer at RT. The flow rate was set at 1 ml/min (for 1 mL prepacked column) or 2.5 ml/min (for 5 ml prepacked column and self-packed column). The 3 times diluted extract (on ice water bath) was loaded onto the Histrap column using ÄKTA program. The flow rate was set at 1 ml/min (for 1 mL prepacked column) or 2.5 ml/min (for 5 mL prepacked column and self-packed column). The loading volume was less than 30 ml/ml resin. The extract flow-through on ice-water bath was collected and stored at 4° C. for further use. The column was washed with 10 CV (column volume) ice cold AQP binding buffer. The flow rate was set at 2.5 ml/min (for 5 ml prepacked column and self-packed column) or set at 1 ml/min for 1 ml prepacked column. The AQP protein was eluted with ice cold AQP elution buffer (10 column volume) at flow rate 2.5 ml/min using ÄKTA program. The fraction volume was set to 10 ml and collection started in 15 mL PP tubes after 0.5-1 CV.

Eluted fractions were capped and stored on ice or 4° C. The AQP purity and conformation was examined by denaturing and native PAGE analysis respectively. Protein concentration was measured by Nanodrop. The extract flow-through may be processed a second and a third time as needed to produce an AQP composition of suitable quality.

When AQP quality analyses are passed, the protein concentration may be adjusted to 5 mg/ml by adding ice cold imidazole-free AQP binding buffer containing 2% LDAO. Finally the AQP was sterilized by filtration through 0.45 μM sterilized cup and stored at 4° C. in refrigerator for use within a month or else stored at −80° C. in a freezer.

Example 1. Preparation and Stopped Flow Testing of PEI-Aquaporin-Z Nanoparticles Poly(ethyleneimine) with MW of 4000 Da (linear) (PEI) was purchased from Sigma Aldrich and was used as received without any other purification. 10 mM phosphate saline solution (PBS) (pH 7.2, 136 mM NaCl, 2.6 mM KCl) was prepared by dissolving 8 g NaCl, 0.2 g KCl, 1.44 g Na$_2$HPO$_4$ and 0.24 g of KH$_2$PO$_4$ in 800 mL MilliQ purified H$_2$O, adjusting the pH to 7.2 with HCl and completing the volume to 1 L. N,N-Dimethyldodecylamine N-oxide BioXtra (Lauryldimethylamine N-oxide) (99% purity), LDAO was purchased from Sigma Aldrich. PEI based self-assembled structures were prepared by direct dissolution method. For that first 100 ml 5 mg/mL PEI in phosphate saline buffer with pH of 7.2 solution was prepared by dissolving 500 mg PEI powder in 100 mL PBS with pH 7.2. Further, 100 mL 5 mg/mL PEI were directly mixed with 1.5 mg as 0.3 mL from 5 mg/mL Aquaporin Z (AQPZ) purified stock solution in 2% LDAO, corresponding to a 1/800 AQPZ/PEI molar ratio of the two components mixture. The PEI-AQPZ mixture was stirred overnight at 170 rotations per minute, overnight not more than 20 hours (but not less than 12 h).

After stirring, next day the mixture was transferred in 100 mL glass bottle and kept at room temperature. The mixture (the liquid formulation—or composition—of PEI-AQPZ based self-assembled structures) can be kept for more than two months. After transfer to the storage glass bottle, the size and the permeability of the PEI-AQPZ self-assembled structures were determined by dynamic light scattering using a ZetaSizer NanoZs from Malvern and stopped-flow using a Bio-Logic SFM 300.

The size of PEI-AQPZ based self-assembled structures was determined as 114±20 nm (80%) of the population, while 20% had a size of around 147±15 nm. In plus the zeta potential was determined for the PEI-AQPZ self-assembled structures as 18.4 mV, indicating the positive charge of the structures.

The permeability data obtained from stopped-flow measurements in 0.3 M NaCl as the osmolyte lead to a fast diffusion coefficient Ki of 1605 $s^{-1}$, corresponding to an osmotic permeability Pf of 22 μm/sec and a permeability of 11 LMH/bar ($L/m^2/h)/bar$).

The temperature stability of the PEI based self-assembled structures was determined by warming up 5 mL for 10 min at various temperatures ranging from 30 to 100° C. and their size and water permeability was further determined by dynamic light scattering and stopped-flow measurements.

The size of the self-assembled structures after the thermal treatment are presented in Table 1.

TABLE 1

Size distribution of nanoparticles in aqueous composition with PEI self-assembled polymer structures after thermal treatment.

| Temperature/° C. | Population 1 distribution/% | Population 1 Size/nm | Population 2 distribution/% | Population 2 Size/nm |
| --- | --- | --- | --- | --- |
| RT | 80 | 11 ± 18 | 20 | 147 ± 25 |
| 30 | 81 | 117 ± 20 | 19 | 178 ± 28 |
| 40 | 69 | 118 ± 15 | 31 | 164 ± 14 |
| 50 | 93 | 112 ± 22 | 7 | 156 ± 23 |
| 60 | 85 | 108 ± 23 | 15 | 148 ± 32 |
| 70 | 94 | 92 ± 15 | 6 | 132 ± 24 |
| 80 | 81 | 108 ± 12 | 19 | 137 ± 18 |
| 90 | 84 | 110 ± 14 | 16 | 136 ± 22 |
| 100 | 76 | 115 ± 23 | 24 | 142 ± 16 |

As seen from Table 1, the size of the formed structures is not affected by temperature exposure even though a slight decrease with around 10 nm is observed from 60° ° C. degrees up. This decrease does not affect the functionality of the nanostructures nor the aquaporin water channels complexed in them when incorporated in the active layer of filtration membranes.

The permeability in the formed nanoparticles after thermal treatment in the presence of AQPZ was determined from the stopped-flow measurements.

TABLE 2

Stopped flow results of composition PEI-AQPZ in 0.3M NaCl.

| Temperature/° C. | Ki Value/$s^{-1}$ | Pf/μm/sec | Water flux lmh/bar |
| --- | --- | --- | --- |
| RT | 1589 | 21.7 | 10.4 |
| 30 | 1601 | 23.1 | 11.1 |
| 40 | 1679 | 24.4 | 11.7 |

TABLE 2-continued

Stopped flow results of composition PEI-AQPZ in 0.3M NaCl.

| Temperature/° C. | Ki Value/$s^{-1}$ | Pf/μm/sec | Water flux lmh/bar |
| --- | --- | --- | --- |
| 50 | 1611 | 22.2 | 10.7 |
| 60 | 1707 | 22.7 | 10.9 |
| 70 | 1713 | 20.1 | 9.9 |
| 80 | 1589 | 21.2 | 10.1 |
| 90 | 1540 | 20.9 | 10.03 |
| 100 | 1533 | 21.7 | 10.4 |

From a water permeability point of view in this particular experiment, no significant changes can be observed up to 100° C., a slight fluctuation of both permeability and water flux is correlated with the size change.

Example 2. Preparation and Testing of PEI Nanostructures with AQP9 and AQP12

In a similar manner, PEI based self-assembled structures with human aquaporins, more specifically aquaporin-9 and aquaporin-12, were prepared by direct dissolution method. For that first 100 ml 5 mg/mL PEI in phosphate saline buffer with pH of 7.2 solution was prepared by dissolving 500 mg PEI powder in 100 mL PBS with pH 7.2. Further, 100 mL 5 mg/mL PEI were directly mixed with 1.5 mg as 0.15 mL from 10 mg/mL Aquaporin-9 and 0.17 mL from 9 mg/ml Aquaporin-12 purified stock solution in 2% LDAO, corresponding to a 1/800 AQP/PEI molar ratio of the two components mixture. The PEI AQP mixture was stirred overnight at 170 rotations per minute, overnight not more than 20 hours (but not less than 12 h).

After stirring next day the mixture was transferred in 100 mL glass bottle, kept at room temperature and measured in the following day. The size and the permeability of the PEI-AQPZ self-assembled structures were determined by dynamic light scattering using a ZetaSizer NanoZs from Malvern and stopped-flow using a Bio-Logic SFM 300.

The size of PEI-AQP9 based self-assembled structures was determined as 91±15 nm (85%) of the population, while 15% had a size of around 325±32 nm. In plus the zeta potential was determined for the PEI-AQP self-assembled structures as 17.9 mV, indicating the positive charge of the structures.

The permeability data obtained from stopped-flow measurements in 0.3 M NaCl as the osmolyte lead to a fast diffusion coefficient Ki of 1326 $s^{-1}$.

The size of PEI-AQP12 based self-assembled structures was determined as 244±36 nm (92%) of the population, while 8% had a size of around 3±2 nm. In plus the zeta potential was determined for the PEI-AQP self-assembled structures as 17.3 mV, indicating the positive charge of the structures.

The permeability data obtained from stopped-flow measurements in 0.3 M NaCl as the osmolyte lead to a fast diffusion coefficient Ki of 1432 $s^{-1}$.

Example 3. Preparation and Testing of Nanostructures with PEI 800 b and 1000 b

In a similar manner as for PEI 4000 Da self-assembled structures with AQPZ, and PEI 800 branched and 10000 branched, were prepared by direct dissolution method. For that first 100 ml 5 mg/mL PEI 800 branched or 10000 branched, in phosphate saline buffer with pH of 7.2 solution was prepared by dissolving 500 mg PEI 800 branched or 10000 branched powder in 100 mL PBS with pH 7.2. Further, 100 mL 5 mg/mL PEI were directly mixed with 1.5 mg as 0.3 mL from 5 mg/mL AqpZ purified stock solution in 2% LDAO, corresponding to a 1/800 AQP/PEI molar ratio of the two components mixture. The PEI AQP mixtures were stirred overnight at 170 rotations per minute, overnight not more than 20 hours (but not less than 12 h). After stirring next day the mixture was transferred in 100 mL glass bottle, kept at room temperature and measured in the following day. The size and the permeability of the PEI-AQPZ self-assembled structures were determined by dynamic light scattering using a ZetaSizer NanoZs from Malvern and stopped-flow using a Bio-Logic SFM 300.

The size of PEI 800 b-AQPZ based self-assembled structures was determined as 180±23 nm (100%) of the population. In plus the zeta potential was determined for the PEI-AQP self-assembled structures as 14 mV, indicating the positive charge of the structures.

The permeability data obtained from stopped-flow measurements in 0.3 M NaCl as the osmolyte lead to a fast diffusion coefficient Ki of 747 $s^{-1}$.

The size of PEI 10000 b-AQPZ based self-assembled structures was determined as 220±37 nm (100%) of the population. In plus the zeta potential was determined for the PEI-AQP self-assembled structures as 4 mV, indicating the positive charge of the structures.

The permeability data obtained from stopped-flow measurements in 0.3 M NaCl as the osmolyte lead to a fast diffusion coefficient Ki of 1516 $s^{-1}$.

The temperature stability of the PEI based self-assembled structures was determined by warming up 5 mL for 10 min at various temperatures ranging from 30 to 100° C. and their size and water permeability was further determined by dynamic light scattering and stopped-flow measurements. For the PEI 600 b based AQPZ self-assembled nanostructures the size does not change up to 50° C., and is increasing with more than 200 nm from 50° C. up, while the Ki values varies with less than 100 $s^{-1}$. For the PEI 10000 b based AQPZ self-assembled nanostructures the size does not change up to 40° C., and is increasing with more than 150 nm from 40° C. up, while the Ki values varies with less than 100 $s^{-1}$.

Example 4. Fluorescence Correlation Spectroscopy

The fluorescent labelling of the transmembrane protein AQPZ was performed by N-hydroxysuccinimide ester (NHS-ester) coupling reaction to primary amines on the proteins. The N terminus of the AQPZ protein contains only hydrophilic amino acid residues. Therefore, it is available for the labelling reaction in the aqueous phase and it is not buried in the hydrophobic part of the membrane protein. In this case, the fluorescent dye Oregon Green 488 (OG488) was used.

For labeling (cf. Itel et al., Nano. Lett., 15 (6): 3871-3878, 2015), 1 mg AQPZ stock solution was mixed with Oregon Green 488 succinimidyl ester (OG488, 10 mg/ml in DMSO) at a 10-fold molar excess and incubated on ice with agitation for 3 hours in the dark. After the non-reacted dye was removed by centrifugation through 2000 Da filters the labelled AQPZ was further used for reconstitution in linear PEI 4000 Da self-assembled nanostructures. From the molecular brightness the number of AQPZ tetramers per PEI nanostructure was determined as 8±1. No free protein was detected. For PEI 600 b and 10000 b the number of AQPZ tetramers per PEI nanostructure was determined as 4±1 (PEI 600 b) and 5±2 (PEI 1000 b)

Example 5. Characterization by Circular Dichroism

The protein conformation of the formed self-assembled nanostructures may be characterized by circular dichroism (CD). CD is a suitable method for rapid determination of the secondary structure (α-helix and the β sheet) and folding properties of proteins that determine its functionality. CD is a spectroscopic technique where the CD spectra of molecules is measured over a range of wavelengths (Greenfield NJ, Nat Protoc. 2006; 1(6): 2876-2890). For that the liquid formulation of PEI-AQPZ based self-assembled structures as prepared according to Example 1 was placed in the measuring cuvette and the CD spectra was recorded and analysed in order to assess the secondary structure of incorporated AQPZ, respectively its functionality. FIG. 1 shows the circular dichroism profile of AQPZ into PEI self-assembled nanostructures. The secondary structure of AQPZ; FIG. 1 reconstituted into PEI self-assembled nanostructures showed a negative ellipticity band at 222 nm compared to 208 nm (222/208 nm ratio equal to 1.15), similar as reported for spinach aquaporin reconstituted in *E. coli* total lipids, indicating that the protein in not unfolded. (Hansen et al., Biochimica et Biophysica Acta 1808: 2600-2607, 2011).

Example 6. Preparation of Handmade TFC FO Filtration Membranes

These membranes were made according to the steps outlined below:
a) Dissolve MPD in MilliQ water to get a 2.5% (W/W) concentration, see below
b) Dissolve TMC in Isopar to a final concentration of 0.15% W/V
c) Cover a rectangular shaped membrane, e.g. 5.5 cm×11 cm Membrana 1FPH PES membrane with about 20 mL/$m^2$ membrane of MPD solution and leave for 30 seconds under gentle agitation
d) Dry the non-active side (back side) with lab drying paper (e.g. Kim-Wipe) for 5-10 seconds
e) Put the membrane on a glass plate and dry gently with $N_2$ until the surface turns from shiny to dim
f) Apply tape around the edges of the membrane (≈1 mm)
g) Put the glass plate with the taped membrane into a glass or metal container, add about 155 mL/$m^2$ membrane TMC-Isopar to one end and rock gently back and forth for 30 seconds
h) Remove glass plate from reservoir and dry with $N_2$ for 10 to 15 seconds After removal of the tape the membrane can be transferred to MilliQ with the newly formed active side up and keep wet during handling in subsequent steps if necessary.
MPD Solution Calculation:
Weigh off 1.05 g of MPD and dissolve in 35 mL of MilliQ. Add 7 mL of PEI-AQPZ composition prepared as described above (3 mg PEI/mL). Keep the solution topped with inert gas (Ar or $N_2$) as much as possible.

TFC membranes with PEI-AQPZ of 5.5 cm×11 cm sizes was then be mounted in a Sterlitech CF042 FO cell and subjected to tests of 60 minutes (5 membranes) and tests of 900 minutes (4 membranes) duration in FO mode using deionised (MilliQ) water as feed and 1 M NaCl aqueous solution as draw and feed and draw speeds of 268 mL/min.

Results are shown in Table 3 below with reproducible high water fluxes, Jw (LMH L/m$^2$/h), low reverse salt rejection, Js (GMH=g/m$^2$/h), and very high rejection of the feed tracer 5 µM calcein Rca %.

TABLE 3

| 60 min Jw (LMH) | 60 min Js (GMH) | 60 min Js/Jw | 60 min Rca (%) | 900 min Jw (LMH) | 900 min Js (GMH) | 900 min Js/Jw | 900 min Rca (%) |
|---|---|---|---|---|---|---|---|
| 8.58 | 1.46 | 0.17 | 99.86 | 8.22 | 1.67 | 0.20 | 99.78 |
| 8.61 | 1.81 | 0.21 | 99.84 | 7.86 | 0.62 | 0.08 | 99.79 |
| 7.93 | 1.75 | 0.22 | 99.85 | 7.55 | 1.47 | 0.19 | 99.8 |
| 7.94 | 1.61 | 0.20 | 99.81 | 8.05 | 1.38 | 0.17 | 99.88 |
| 8.19 | 1.47 | 0.18 | 99.88 | | | | |

Example 7. Pilot Machine Made FO Filtration Membranes

A TFC layer was formed on a PES support membrane using a pilot coating machine.
 a) An MPD/water solution was made by dissolving MPD in MilliQ water to get a 2.5% (W/W) concentration
 b) An Aquaporin/MPD/water solution was made by dissolving 6.25 g MPD, 10 mL Composition, 240 mL Di water
 c) TMC was dissolved in Isopar to a final concentration of 0.15% W/V;
 d) A roll of Membrana 1FPH support membrane was installed on the unwinding unit of the machine
 e) The membrane was threaded through the coating
 f) The washing bath was filled with Di water
 g) The coating process was run (at 0.6 m/min):
  membrane was unrolled from unwinder;
  then soaked in MPD/water in foulard bath;
  surface water was removed by air knife (0.5 bar air);
  Aquaporin/MPD/water solution was applied via slot die at pump rate of 1.2 mL/min;
  surface water was removed via air knife to ensure a droplet free surface before interfacial polymerization (0.75 bar);
  TMC/Isopar was applied via slot die at 4.2 mL/min to start interfacial polymerization;
  Isopar dried off the surface of the membrane at ambient air;
  leftover chemicals were removed in wash bath;
  coated membrane was rolled up with active side pointing towards the roll.
 h) The coated membrane was run through a final drying step 5 coated membranes were cut in 5.5 cm×11 cm shapes and separately fitted into a Sterlitech CF042 FO cell and run for 200 minutes with a 5 µM calcein in DI water feed solution and a 1 M NaCl draw solution. Mean results with standard deviation are shown in Table 4.

TABLE 4

| Jw [L/m2h] | Js, total [g/m2h] | Js/Jw | Rcalcein [%] |
|---|---|---|---|
| 8.72 | 1.94 | 0.22 | 99.81 |
| 0.95 SD | 0.24 SD | 0.03 SD | 0.09 SD |

Example 8. Pilot Machine Made FO High Flux and High Rejection Filtration Membranes Using a similar approach to that described in Example 4, a TFC layer was formed on two types of microporous PES membranes having a non-woven polypropylene backing adapted for high water flux and for high salt rejection, respectively. A first roll of microporous PES membrane was mounted at one end of the pilot machine and conveyed through successive steps to produce an interfacial polymerisation layer on top. The membrane was passed through a tank containing an aqueous 2% MPD solution comprising 7 mL/100 mL PEI-AQP composition (prepared according to Example 1), 3% &-caprolactam, and 0.1% SDS. The membrane was then subjected briefly to compressed air drying and passed by a top mounted slot die for reaction with a 0.20% TMC in Isopar solution to form the active top layer.

A second roll of microporous PES membrane was mounted at one end of the pilot machine and conveyed through a tank to produce an interfacial polymerisation layer on top. Said tank contained an aqueous 2.75% MPD solution comprising 7 mL/100 mL PEI-AQP composition (prepared according to Example 1). The membrane was then subjected briefly to compressed air drying and passed by a top mounted slot die for reaction with a 0.25% TMC in Isopar solution to form the active top layer. Sections of the two types of prepared membrane were cut in rectangular shape of 5.5 cm×11 cm, then mounted in a Sterlitech CF042 chamber and subjected to 5 test of 60 minutes duration in PRO mode using deionised water as feed and 1 M NaCl aqueous solution as draw and feed and draw speeds of 268 mL/min. Results are shown in Table 5 below, where consistent high water flux with acceptably low reverse salt flux have been measured for the high flux membrane, and consistent low reverse salt flux with acceptably high water flux has been measured for the high rejection membrane.

TABLE 5

| High flux, Jw (LMH) | High flux, Js (GMH) | High rej., Jw (LMH) | High rej., Js (GMH) |
|---|---|---|---|
| 12.66 | 5.25 | 7.40 | 0.61 |
| 14.31 | 2.00 | 8.27 | 0.55 |
| 14.87 | 6.02 | 7.40 | 0.32 |
| 12.40 | 3.50 | 6.41 | 0.85 |
| 13.26 | 4.61 | 8.07 | 0.94 |

Example 9. Handmade TFC PEI-AQPZ Filtration Membranes for RO Low Pressure

The membranes were made according to the steps outlined below:
 a) Provide a support membrane, e.g. a PES non-woven having fingerlike structure, size 5.5 cm×11 cm
 b) Mix 3 wt % MPD with 3 wt % &-caprolactam, 0.5 wt % NMP, and 93.5 wt % DI water to obtain a solution
 c) Add 0.1 mg/mL of PEI-AQPZ self-assembled nanostructures to obtain a suspension
 d) Incubate the suspension from c) for 2 hours
 e) Prepare TMC solution from 0.09 wt % TMC, 0.9 wt % acetone, and 99.01 wt % Isopar
 f) Dip coat the support membrane in the suspension d) for 30 seconds
 g) Apply drying with air knife
 h) Add the TMC solution from e) for interfacial polymerization
 i) Follow with 2 min drying in fume hood
Optional post treatment of TFC membrane following the steps:
 4 min 65° C. 10% Citric Acid
 2 min DI water 1 min 5% IPA
2 min DI water
1 min 0.1% NaOCl
2 min DI water
1 min 0.2% NaHSO3

Four membranes were made and mounted in a Sterlitech CF042 RO cell operated at 5 bar using 500 ppm NaCl as feed for 60 minutes. The results are shown in Table 6. It can be seen that the RO performance is both satisfactory and highly reproducible.

TABLE 6

| No. of samples | Permeability Average and SD (LMH/bar) | Rejection (%) Average and SD |
|---|---|---|
| 4 | 8.28 ± 0.12 | 89.0 ± 1.40 |

Example 10. Handmade LbL Membranes for High Rejection Filtration

The LbL polyelectrolyte technique can be used to prepare filtration membranes based on a PES membrane (as the supporting substrate) and a PEI/PAA (polyethyleneimine/polyacrylic acid) polyelectrolyte layer and incorporating PEI based self-assembled nanostructures with aquaporin.

The membranes may be prepared according to the procedure as outlined below:

Step 1. Select and prepare the negatively charged PES on the nonwoven support by atmospheric plasma treatment.

Step 2. Adsorb PEI on the negatively charged surface of the substrate by electrostatic attraction; by immersion of the charged PES in a PEI solution (concentration similar to the PEI formulation of PEI-AQPZ based self-assembled structures as prepared according to Example 1—or a different concentration depending on the desired final thickness of the layer)

Step 3. Wash the substrate surface with de-ionized water in order to remove excess PEI molecules which are not strongly adsorbed on the surface;

Step 4. Immerse the PES covered with PEI into a PAA solution (molar concentration equivalent to PEI concentration), where the negative charges will be adsorbed onto the surface;

Step 5. Wash PES surface covered with PEI and PAA with de-ionized water in order to remove excess PAA molecules Step 6. Repeat steps 2-5 until reaching the targeted number of multilayers –2.

Step 7. Immerse PAA covered PES multilayered structure in a formulation of PEI-AQPZ self-assembled structures (as prepared in example 1; used as is).

Step 8. Wash with deionized water

Step 9. Immerse PEI/Aquaporin PAA covered PES multilayered structure in PAA solution.

In case other pairs of electrolytes are preferred, a similar procedure will be used in order to prepare the membranes.

In this example, the formulation of PEI-AQPZ self-assembled structures is used in the last steps to replace the polycation used to assembly the electrolyte multilayers. Alternatively, the formulation of PEI-AQPZ self-assembled structures may be used to replace the polycation in forming several of the LbL layers.

Example 11. Coating a Hollow Fiber (HF) Hemodialysis Module

Coating protocols for 2.3 m² HF hemodialysis module used the following three main steps: I—MPD-water wetting. II—module drying and III—reaction with TMC-isopar. As shown in FIG. 2, during the module drying step (II step) the module is here placed horizontally which may limit the gravitational movement of water in the module, which will be more pronounced for longer modules. However, the modules #74 and #75 were coated using vertical position during step II. Moreover, instead of closed shell connections, the shell side was connected to a vacuum pump (or a peristaltic pump), which creates small vacuum on the shell side and collects accumulated water. Without wishing to be bound by any particular theory, the present inventors have found that by applying vacuum on the shell side, lumens of the fibers are dried more uniformly along the module. Most of the water is removed from the lumen of the fibers by created vacuum in the module (from the shell side) and air applied for drying is removing only water adsorbed on the surface. This principle can be used independently of the module shell being held in vertical or horizontal position, cf. performance results in Table 7.

Different concentrations of aqueous MPD solution were tested, cf. Table 7. An aqueous formulation of aquaporin-Z was added to the MPD solution, such as 7 mL/100 mL PEI-AQP composition (prepared according to Example 1) along with optional additives, cf. Example 8. In addition, different concentrations of TMC (organic phase) were tested. All combinations worked well cf. Table 7.

An additional aqueous formulation of aquaporin-Z used in the preparation of HF modules according to the method described herein comprises vesicles formed from PMOXA24-PDMS65+PMOXA32-PDMS65 diblock copolymer blend comprising detergent solubilised aquaporin. Said vesicles are prepared according to the following method:

Main Vesicle Forming Materials:

Poly(2-methyloxazoline)-block-poly(dimethylsiloxane) diblock copolymer PDMS65PMOXA24 (DB1) purchased as a viscous white liquid used as received.

Poly(2-methyloxazoline)-block-poly(dimethylsiloxane) diblock copolymer PDMS65PMOXA32 (DB2) purchased as a viscous white liquid used as received.

As Additives:

Poly(2-methyloxazoline)-block-poly(dimethylsiloxane)-block-poly-(2-methyloxazoline) triblock copolymer $PMOXA_{12}PDMS_{65}PMOXA_{12}$ (TB) purchased as a viscous white liquid used as received as a hydrophobicity agent, and bis(3-aminopropyl) terminated poly(dimethylsiloxane) having a molecular weight of 2500 Da purchased as a liquid from Sigma Aldrich used as received as a cross-linking agent.

Phosphate buffer 10 mM (PBS) (pH 7.2, 136 mM NaCl, 2.6 mM KCl) was prepared by dissolving 8 g NaCl, 0.2 g KCl, 1.44 g $Na_2HPO_4$ and 0.24 g of $KH_2PO_4$ in 800 mL MiliQ purified H2O, adjusting the pH to 7.2 with HCL and completing the volume to 1 L. Further detergent additives were N,N-Dimethyldodecylamine N-oxide BioXtra (Lauryldimethylamine N-oxide) (LDAO) was purchased from Carbosynth, and Poloxamer P123 purchased from Sigma Aldrich as a 30% solution in water.

AqpZ 5 mg/mL in 0.2% LDAO in the stock (purified as described above).

Preparation Method
1. Prepare P123 solution by dissolving 15 mL P123 in 1 L PBS.
2. Prepare a 5% LDAO solution in PBS by dissolving 5 g LDAO in 100 mL PBS.
3. In the preparation vessel weight DB1 to reach a concentration of 0.5 g DB1/L of prepared formulation.

4. In the same preparation vessel weight DB1 to reach a concentration on 0.5 g DB2/L of prepared formulation. (1:1 weight ratio DB1 and DB2)
5. In the same preparation vessel weight, add TB hydrophobicity additive to reach a concentration of 0.12 g TB/L of prepared formulation.
6. Add LDAO 5% prepared in step 2 in the proportion 100 mL/L of prepared formulation
7. Add the bis(3-aminopropyl) terminated poly(dimethylsiloxane) to reach a final concentration of 0.1%.
8. Add AqpZ stock solution to reach a concentration of 5 mg/L of prepared formulation and a 1/400 protein:polymer ratio.
9. Add poloxamer P123 solution prepared in step 1 to reach the desired volume of prepared formulation subtracting the volumes of LDAO, bis(3-aminopropyl) terminated poly(dimethylsiloxane) and AQPZ added in step 6 and 8.
10. Stir the mixture from step 10 overnight at 170 rotations per minute (not more than 20 hours) at room temperature to achieve the formulation.
11. Next morning take the prepared Ex. 3 formulation obtained in the sequence of steps 1 to 9, and filter it through 200 nm pore size filters to sterilize it, put it in a closed sealed bottle and keep it at room temperature for not more than 12 months.

Modules #72 and #73 were prepared using this formulation of aquaporin-Z. The performance results are shown in Table 7. All other modules tested were coated using the 7 mL/100 mL vesicles AQP composition.

Moreover, due to the relatively low transmembrane pressure, water can not be removed from the pores of the fibers since capillary forces are present and will maintain pores filled with water. The presence of these capillary forces prevents complete removal of the water phase from the support, thus, interfacial polymerization is allowed to occur on the surface of the membrane in step III. Coating of TFC layer with this method allowed FO test with satisfactory results, as listed in Table 7.

Forward osmosis performance of the formed HF TFC membrane were determined by the characteristics of the polyamide layer formed in the interfacial polymerization process. In order to adjust the properties of such layer, compositions of water and organic phase were varied. The goal was to obtain stable TFC/Aquaporin Inside™ coating with reverse salt flux $J_s<4$ g/m² h and as low as possible specific reverse salt flux $J_s/J_w$. In the standard protocol used for coating of 0.6 m² modules, 2.5% MPD and 0,15% TMC was used. The investigated concentration of MPD was 2.5% and 5%. The concentration of TMC was varying from 0.1% to 0.5%. The FO performance of that obtained TFC membranes are listed in Table 7.

As shown in Table 7, TFC/Aquaporin Inside™ coating was successful for all listed membranes and varying concentrations of the MPD and TMC reactants. In general, with increasing concentration of MPD, $J_w$ increases reducing slightly $J_s$, which is not necessarily connected with higher salt retention of the layer but with greater convective flux of water through the membrane. By increasing concentration of TMC from 0.1% to 0.15% and 0.2%, $J_s$ reduces meaning layer gets more cross-linked and more salt rejective. Moreover, a higher increase of TMC concentration led to the further reduction of $J_s$. However, together with $J_s$, $J_w$ is reduced as well. That behaviour suggests an increase of the layer thickness, without an increase of the layer selectivity towards salt rejection. For comparison, two modules (#15 and #16) were coated without the use of an applied vacuum resulting in leaky membranes. Using the vertical position during the drying step II, cf. FIG. 2, also resulted in acceptable performance as long as the vacuum was applied, cf. module #73 and 74 data shown in Table 7.

TABLE 7

| Module | MPD (%) | TMC (%) | Drying method | Jw (Lm²h) | Js (g/m²h) | Js/Jw (—) | Real (%) |
|---|---|---|---|---|---|---|---|
| #8 | 2.5 | 0.15 | horizontal, with vacuum | 15.52 | 5.10 | 0.33 | 99.10 |
| #9 | 2.5 | 0.15 | horizontal, with vacuum | 14.43 | 5.07 | 0.35 | 99.32 |
| #12 | 5 | 0.15 | horizontal, with vacuum | 17.16 | 4.66 | 0.27 | 99.24 |
| #13 | 5 | 0.15 | horizontal, with vacuum | 15.82 | 4.47 | 0.28 | 99.20 |
| #17 | 2.5 | 0.1 | horizontal, with vacuum | 18.70 | 8.49 | 0.45 | 99.24 |
| #18 | 2.5 | 0.1 | horizontal, with vacuum | 17.60 | 6.97 | 0.40 | 98.88 |
| #21 | 2.5 | 0.2 | horizontal, with vacuum | 14.51 | 5.97 | 0.32 | 99.28 |
| #22 | 2.5 | 0.2 | horizontal, with vacuum | 16.20 | 5.64 | 0.35 | 98.06 |
| #19 | 2.5 | 0.3 | horizontal, with vacuum | 13.90 | 3.90 | 0.28 | 98.58 |
| #20 | 2.5 | 0.3 | horizontal, with vacuum | 17.60 | 4.41 | 0.35 | 98.77 |
| #30 | 2.5 | 0.4 | horizontal, with vacuum | 12.54 | 4.20 | 0.34 | 98.71 |
| #32 | 2.5 | 0.5 | horizontal, with vacuum | 11.38 | 4.14 | 0.36 | 99.22 |
| #71 | 2.5 | 0.15 | horizontal, with vacuum | 11.65 | 3.11 | 0.27 | n.a. |
| #72 | 2.5 | 0.15 | horizontal, with vacuum | 11.92 | 2.73 | 0.23 | n.a. |
| #73 | 2.5 | 0.15 | vertical, with vacuum | 15.38 | 6.59 | 0.43 | n.a. |
| #74 | 2.5 | 0.15 | vertical, with vacuum | 14.45 | 4.08 | 0.28 | n.a. |
| #15 | 2 | 0.05 | horizontal, without vacuum | leaky | | | |
| #16 | 2.5 | 0.05 | horizontal, without vacuum | leaky | | | |

Example 12. Testing of Low Pressure Reverse Osmosis (LPRO) Performance of a Set of HF Modules Having Fibers Modified with a Selective Layer Comprising Self-Assembled PEI/Aquaporin-Z Nanostructures A number of 2.3 m² xevonta low flux dialysers (HF modules) were purchased from B. Braun Avitum AG, Schwarzenberger Weg 73-79, 34212 Melsungen, Germany, and subsequently treated to have their inner fiber surfaces modified as described herein, cf. bbraun.com/content/dam/catalog/bbraun/bbraunProductCatalog/CW_01_NEW/en-01/b43/brochure-xevonta.pdf.bb-.25584796/brochure-xevonta.pdf and Example 11 above.

The modified modules were used in a low pressure reverse osmosis (LPRO, also called tap water reverse osmosis TWRO) operation using 500 ppm NaCl solution as the feed water at 4 bar applied pressure.

Membrane testing is carried out with 500 ppm NaCl. In order to obtain this concentration, 10 g of NaCl (99%) is dissolved in 20 L of water. After mixing for at least 15 minutes, the conductivity of well prepared solution should be about 1100±100 µS/cm. FIG. 3 shows a schematic description of the applied L.PRO setup used in testing of 2.3 m2 modules FV-flow meter, P-manometer, C-conductivity meter.

The schematic description of the used setup is shown on FIG. 3. The test configuration was applied for 1 up to maximum 8 modules tested subsequently in a rack and connected to the same feed solution. Before the test, all the modules were flushed with RO water (<10 ρS/cm) for at least 1 hour. After this, feed solution containing 500 ppm was introduced in to the module with flow rate of 300-500 mL/min per module. The pressure of the filtration (1 bar) was adjusted using valve 3 (see FIG. 3). The system was then equilibrated after introduction of feed solution and new pressure adjustment for at least 1 hour, and the retentate and permeate were transported back to the feed reservoir (See FIG. 3, valve 1 closed and valve 2 open) and the samples was not collected. After equilibration of the system, permeate was not recirculated to the reservoir, but sample collection started by subsequent closing of valve 2 and opening of valve 1 (see FIG. 3). During the collection of the samples, time of the collection was measured and usually varied from 10 to 30 seconds. The collected volume of each permeate sample was measured in volumetric cylinder, together with conductivity of the permeate. The samples of permeate were collected 4 times at the same pressure. After this, pressure was increased to 2 bars and permeate was recirculating in to the feed by closing valve 1 and opening valve 2 (see FIG. 1). Again, system was equilibrated for about 1 hour. The procedure was repeated for measurement at 1-4 bars. Collection time and volume of the measured sample allowed calculation of the water permeability coefficient A according to equation 1

$$A = \frac{\Delta V}{A \cdot \Delta t \cdot (\Delta P - \pi)} \quad (1)$$

where:
A is water permeability coefficient ($L/m^{-2}\ h^{-1}\ bar^{-1}$)
$\Delta V$ is volume of collected permeate (L)
$\Delta t$ is time of the permeate collection (h)
$\Delta P$ is transmembrane pressure (bar)
$\pi$ is osmotic pressure of feed (bar)
Process rejection of the salt was calculated according to the equation 2.

$$R_{NaCl} = \frac{K_F \cdot K_P}{K_F} \cdot 100\% \quad (2)$$

where:
$R_{NaCl}$ is process rejection of the salt (−)
$K_F$ is conductivity of the feed (μS/cm)
$K_P$ is conductivity of the permeate (μS/cm)
Salt permeation coefficient B is calculated from the equation 3

$$B = \frac{1 - R_{NaCl}}{R_{NaCl}} \frac{J_w}{\exp\left(\frac{J_w}{k}\right)} \quad (3)$$

where:
B is salt permeability coefficient ($L/m^{-2}\ h^{-1}$)
$R_{NaCl}$ is process rejection of the salt (−)
$J_w$ is water flux ($L/m^{-2}\ h^{-1}$)
k mass transfer coefficient from the feed side ($L/m^{-2}\ h^{-1}$)

The performance results are shown in Table 8 below. The results show good reproducibility and performance values, in agreement with generally accepted standards for potable water.

TABLE 8

| Module No. | A aver LMH/bar | A std | R aver % | R std | B aver LMH | B std | A/B/bar |
|---|---|---|---|---|---|---|---|
| #42 | 1.19 | 0.18 | 82.99 | 0.41 | 0.86 | 0.07 | 1.39 |
| #44 | 0.93 | 0.08 | 94.04 | 0.17 | 0.23 | 0.04 | 4.11 |
| #45 | 0.97 | 0.07 | 88.07 | 0.50 | 0.44 | 0.07 | 2.19 |
| #47 | 1.03 | 0.11 | 89.62 | 0.38 | 0.42 | 0.05 | 2.43 |
| #48 | 0.79 | 0.06 | 94.12 | 0.08 | 0.19 | 0.03 | 4.18 |
| #50 | 0.90 | 0.08 | 91.14 | 0.24 | 0.33 | 0.06 | 2.76 |
| #51 | 0.82 | 0.07 | 92.25 | 0.18 | 0.24 | 0.03 | 3.38 |

Figure 4:
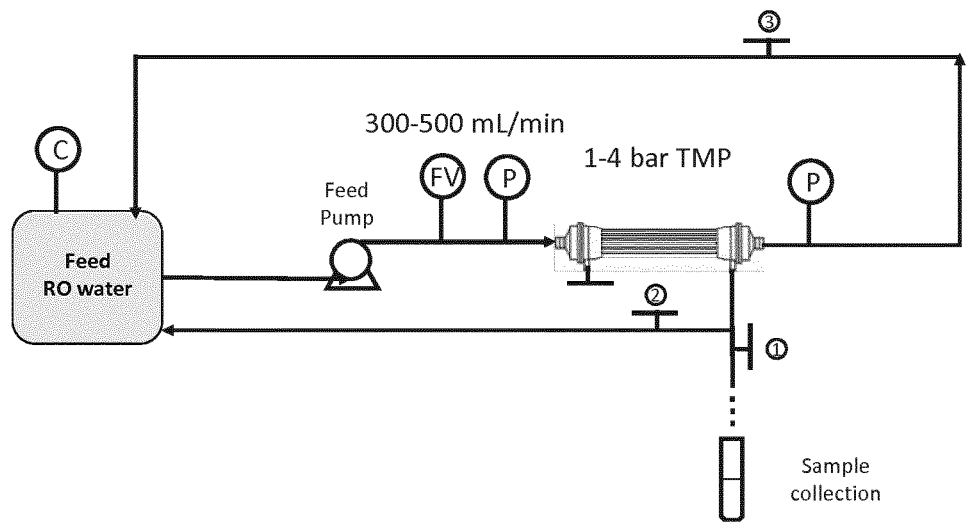
FIG. 4. A schematic description of the applied single-pass FO testing method used in testing of 2.3 $m^2$ modules. Legend: FV-flow meter, P-manometer, C-conductivity meter.

Example 13. FO Testing in Single Pass Mode of a Set of HF Modules Having Fibers Modified with a Selective Layer Comprising Self-Assembled PEI/Aquaporin-Z Nanostructures A series of 4 HF modules were prepared as in the previous example. A standard membrane test is carried out with 1 M NaCl as a draw solution, and before use conductivity of such prepared solution should be about 92.5±1.5 mS/cm. RO water having a standardized conductivity of <10 μS/cm is used as a feed solution without further processing. FIG. 4 is a schematic description of the applied single-pass testing method used in testing of 2.3 m² modules. Legend: FV-flow meter, P-manometer, C-conductivity meter.

Feed solution was introduced into the module with 60 L/h, whereas draw solution was introduced with 25 L/h. Draw and the feed were connected in counter-current flow. The pressure of the feed solution and the draw solution from all the inlets were monitored. Tests were carried out at average TMP of 0.2 bar from the feed side. Tests were conducted for 1 hour. The feed solution (here: RO water) and draw solution (1 M NaCl) were not recirculated. Instead, concentrate of feed solution was collected on the balance. Feed out-flow from the module was calculated and subtracted from the feed in-flow the module in order to calculate flux through the membrane according to equation 4.

$$J_w = \frac{\dot{Q}_{Feed} - \dot{Q}_{Concentrate}}{A} \quad (4)$$

where:
$J_w$ is water flux ($L/m^2\ h$)
$\dot{Q}_{Feed}$ is flow rate of feed (L/h)
$\dot{Q}_{Concentrate}$ is flow rate of concentrate (L/h)
A is membrane area (m²)
Conductivity of the concentrated feed solution was measured in order to calculate reverse salt flux according to the equation 5.

$$J_s = \frac{\dot{Q}_{Concentrate}}{A} \kappa \cdot B \quad (5)$$

where:
$J_s$ is reverse salt flux ($L/m^2\ h$)
$\dot{Q}_{concentrate}$ is flow rate of concentrate (L/h)

A is membrane area ($m^2$)
K is conductivity (µS/cm)
B is proportionality coefficient (0,5362 µS/cm per 1 mg/L of NaCl)

Draw solution in flow to the module was controlled by a draw pump. Each module was run in 3 to 5 consecutive tests, and the results are shown in Table 9 below. The results show that the reproducibility of the method is high, and the modules maintain the performance.

TABLE 9

| Module No. | Jw L/$m^2$h | Js, total g/$m^2$h | Js/Jw g/L | Date |
|---|---|---|---|---|
| 56 | 10.59 | 2.34 | 0.22 | 11 Jan. 2017 |
|    | 11.10 | 2.26 | 0.20 | 11 Jan. 2017 |
|    | 11.73 | 3.02 | 0.26 | 12 Jan. 2017 |
| 57 | 10.72 | 2.81 | 0.26 | 11 Jan. 2017 |
|    | 11.73 | 2.62 | 0.22 | 11 Jan. 2017 |
|    | 12.50 | 3.93 | 0.31 | 12 Jan. 2017 |
|    | 12.36 | 3.11 | 0.25 | 12 Jan. 2017 |
| 58 | 11.49 | 3.63 | 0.32 | 11 Jan. 2017 |
|    | 11.61 | 4.32 | 0.37 | 11 Jan. 2017 |
|    | 12.64 | 4.80 | 0.38 | 12 Jan. 2017 |
| 59 | 11.71 | 2.70 | 0.23 | 12 Jan. 2017 |
|    | 10.65 | 2.79 | 0.26 | 12 Jan. 2017 |
|    | 11.50 | 3.63 | 0.32 | 13 Jan. 2017 |
|    | 11.71 | 3.57 | 0.30 | 13 Jan. 2017 |
|    | 11.54 | 3.46 | 0.30 | 17 Jan. 2017 |

REFERENCES

The references cited herein are expressly incorporated by reference for all purposes in their entirety.

Decher, G., J. D. Hong, Phys. Chem. 95 (1991)1430-1434.
Dlugolecki et al. (Journal of Membrane Science, 319 214-222, 2008)
Duong, P. H. H., Zuo, J., Chung, T-S., J. Memb. Sci. 427 (2013), 411-421.
Gribova et al., Chem. Mater., 24: 854-869, 2012.
Iler, P. K, J. Colloid Sci. 21 (1966) 569-594.
Jian, S. P, Liu, Z., Tian, Z. Q., Adv. Mater 18 (2006), 1068-1072.
Joseph, N, Ahmadiannamini, P, Hoogenboom, R, Vankelecom, F. J., Polym. Chem. 5 (2015), 1817-1831.
Karlsson et al., FEBS Letters, 537: 68-72, 2003.
Kong et al., RSC Adv., 4: 37592-37599, 2014.
Schroeder et al., J. Controlled Release, 160(2): 172-176, 2012.
Thomas & Venkiteswaran, Biophysical Journal, 106 (2): 276-277, 2014.
Wang et al., Membranes, 5(3), 2015, 369-384
Zhang, P., Qian, J., Yang, Y., An, Q., Liu, X., Gui, Z., J. Membr. Sci. 320 (2008) 73-77.
Zhang, Y., Layer-by-layer Self-assembly Membranes for Solvent Dehydration by Pervaporation, PhD Thesis, University of Waterloo (2013)
U.S. Pat. No. 4,277,344
US Patent Application No: 2012/0080377.
WO2010/146365 (Aquaporin A/S).
WO2013/043118 (Aquaporin A/S).
WO2006/122566 (Aquaporin A/S).
WO2007/033675 (Aquaporin A/S).
WO2013/043118 (Aquaporin A/S).

The invention claimed is:

1. A separation membrane comprising a substrate with an active layer, wherein the active layer comprises a self-assembled nanostructure comprising polyalkyleneimine (PAI) complexed with a detergent solubilized transmembrane protein, wherein the self-assembled nanostructure is not a vesicle, and wherein the active layer is a thin film composite layer comprising crosslinked aromatic polyamide.

2. The separation membrane according to claim 1, wherein said transmembrane protein is an aquaporin water channel.

3. The separation membrane according to claim 1, wherein the PAI is polyethyleneimine (PEI).

4. The separation membrane according to claim 3, wherein the PEI is a substantially linear polymer having an average molecular weight of between about 2,000 Da to about 10,000 Da.

5. The separation membrane according to claim 3, wherein the PEI is a substantially linear polymer having an average molecular weight of between about 3,000 Da to about 5,000 Da.

6. The separation membrane according to claim 1, wherein the detergent is selected from the group consisting of N,N-Dimethyldodecylamine N-oxide (LDAO), n-Octyl-β-D-glucopyranoside (OG), n-Dodecyl β-D-maltoside (DDM) or a combination thereof.

* * * * *